(12) United States Patent
Kunz et al.

(10) Patent No.: US 11,811,103 B2
(45) Date of Patent: Nov. 7, 2023

(54) SEPARATOR PLATE FOR AN ELECTROCHEMICAL SYSTEM

(71) Applicant: Reinz-Dichtungs-GmbH, Neu-Ulm (DE)

(72) Inventors: Claudia Kunz, Ulm (DE); Bernd Gaugler, Ulm (DE); Stephan Wenzel, Pfaffenhofen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 137 days.

(21) Appl. No.: 17/310,892

(22) PCT Filed: Feb. 27, 2020

(86) PCT No.: PCT/EP2020/055117
§ 371 (c)(1),
(2) Date: Aug. 27, 2021

(87) PCT Pub. No.: WO2020/174038
PCT Pub. Date: Sep. 3, 2020

(65) Prior Publication Data
US 2022/0149392 A1    May 12, 2022

(30) Foreign Application Priority Data
Feb. 28, 2019  (DE) ............... 20 2019 101 145.9

(51) Int. Cl.
*H01M 8/0254* (2016.01)
*H01M 8/0206* (2016.01)
*H01M 8/0271* (2016.01)

(52) U.S. Cl.
CPC ....... *H01M 8/0254* (2013.01); *H01M 8/0206* (2013.01); *H01M 8/0271* (2013.01)

(58) Field of Classification Search
CPC . H01M 8/0254; H01M 8/0271; H01M 8/0206
See application file for complete search history.

(56) References Cited

U.S. PATENT DOCUMENTS 10,854,891 B2 * 12/2020 Glueck ............... H01M 8/0206

FOREIGN PATENT DOCUMENTS

| DE | 202014006840 U1 | 11/2015 |
| DE | 202015104972 U1 | 12/2016 |
| DE | 102017122905 A1 | 4/2018 |

OTHER PUBLICATIONS

ISA European Patent Office, International Search Report Issued in Application No. PCT/WP2020/055117, dated May 12, 2020, WIPO, 2 pages.

* cited by examiner

*Primary Examiner* — Karie O'Neill Apicella
(74) *Attorney, Agent, or Firm* — McCoy Russell LLP

(57) ABSTRACT

A separator plate for an electrochemical system, comprising: at least one of the flanks of the bead assembly has a multiplicity of passages for directing a medium through the bead flank, and a distributing or collecting structure has a multiplicity of line ducts and a multiplicity of openings, wherein the line ducts adjoin the passages in the bead flank on an external side of the bead assembly, wherein the openings are disposed on a side of the distributing or collecting structure that faces away from the bead assembly and, are fluidically connected to a bead interior.

24 Claims, 5 Drawing Sheets

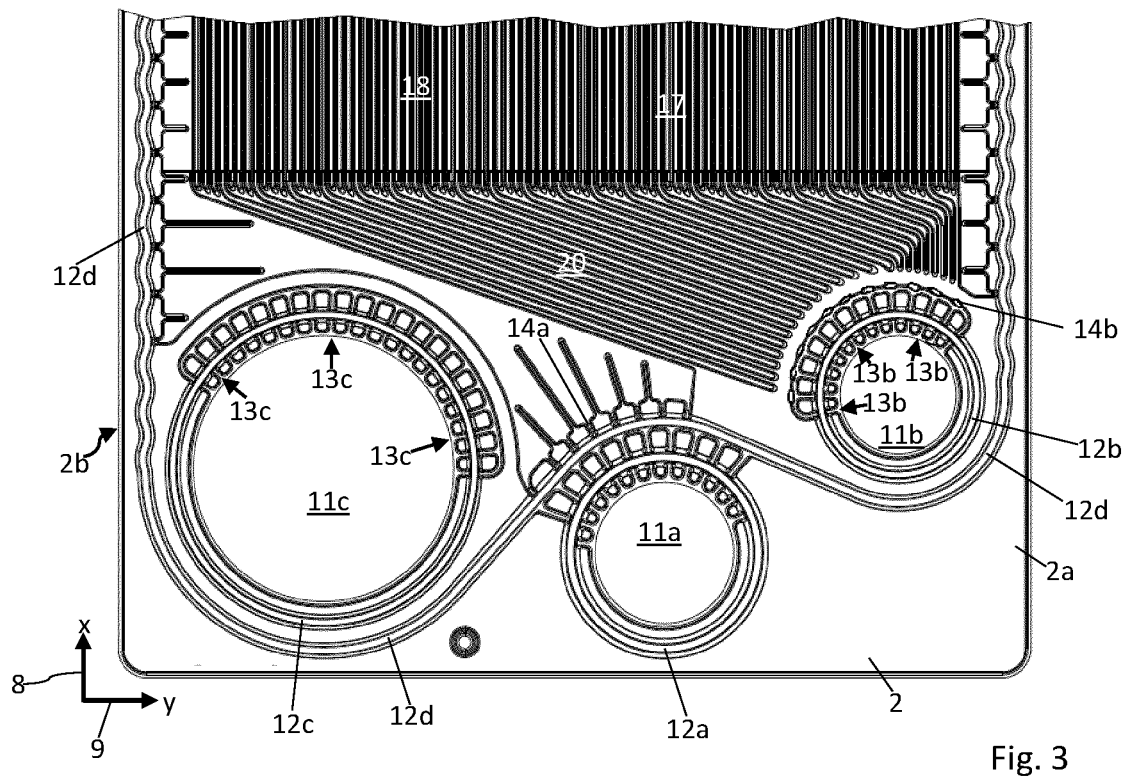
Fig. 3
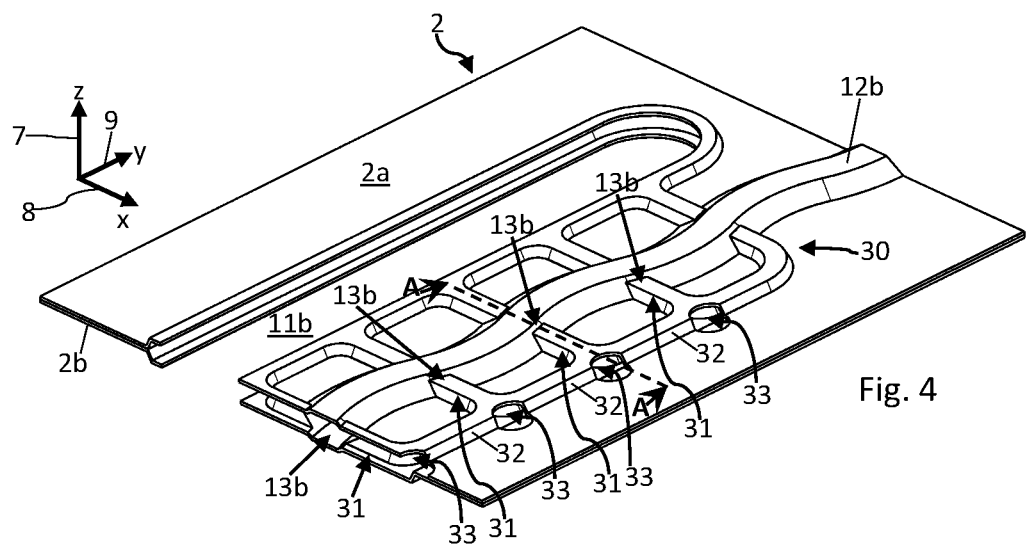
Fig. 4
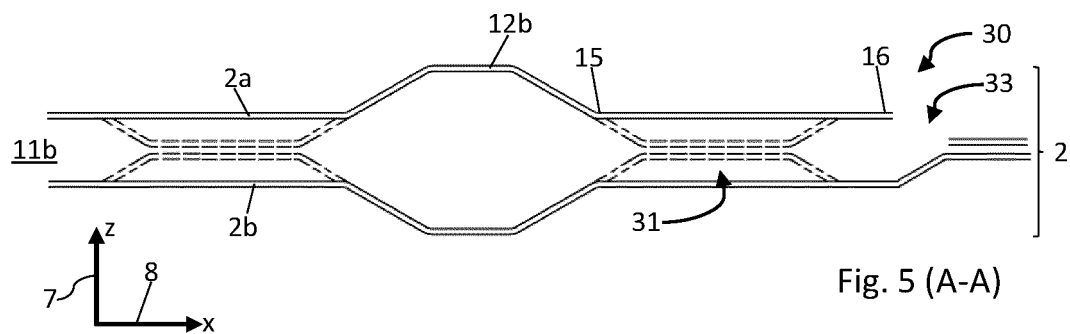
Fig. 5 (A-A)

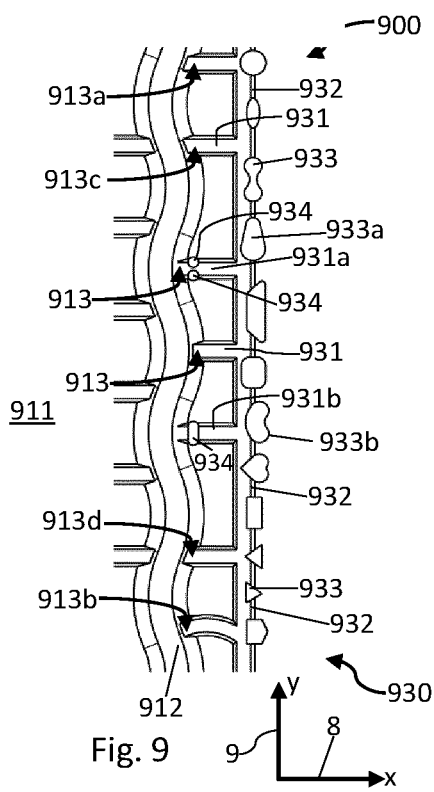
Fig. 9
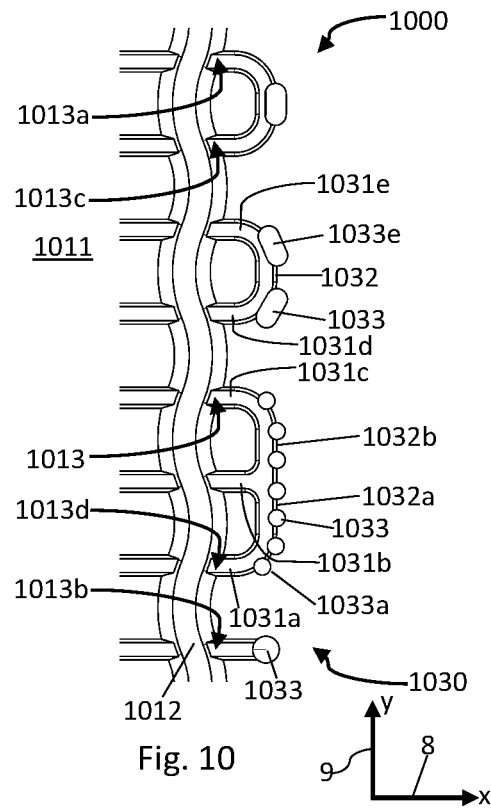
Fig. 10
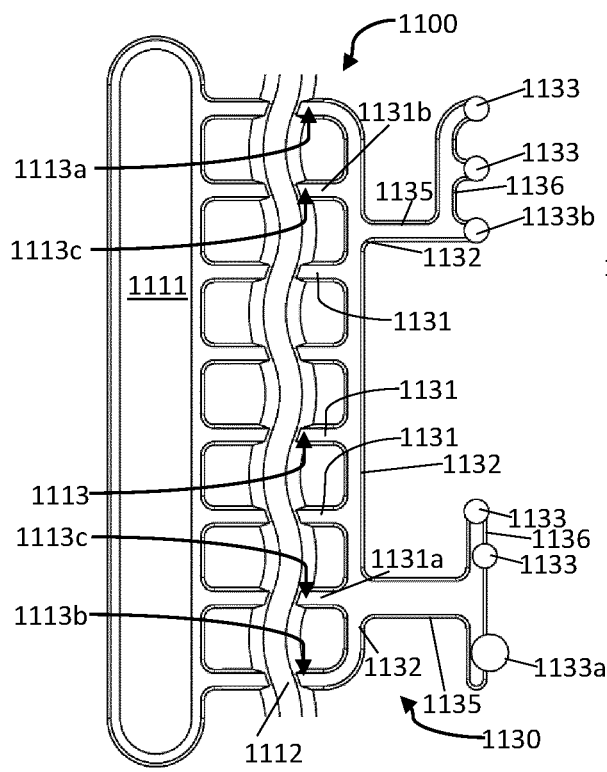
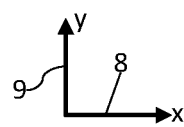
Fig. 11
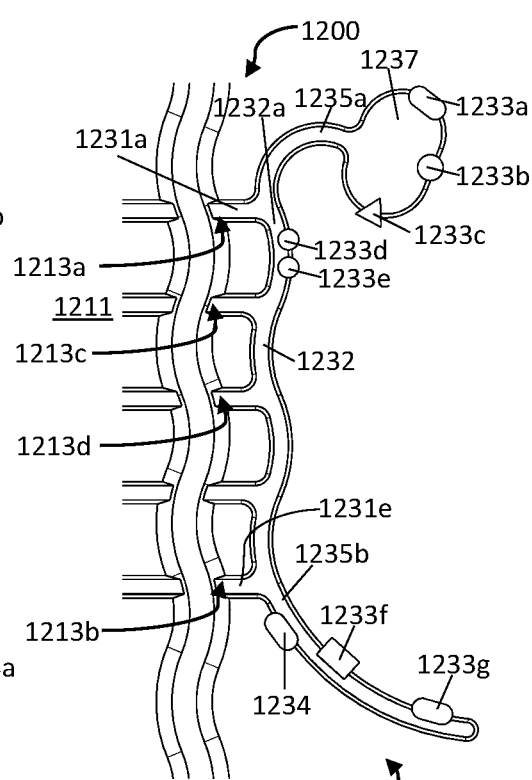
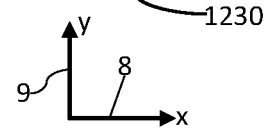
Fig. 12

SEPARATOR PLATE FOR AN ELECTROCHEMICAL SYSTEM

CROSS-REFERENCE TO RELATED APPLICATIONS

The present application is a U.S. National Phase of International Patent Application Serial No. PCT/EP2020/055117 entitled "SEPARATOR PLATE FOR AN ELECTROCHEMICAL SYSTEM," filed on Feb. 27, 2020. International Patent Application Serial No. PCT/EP2020/055117 claims priority to German Utility Model Application No. 20 2019 101 145.9, filed on Feb. 28, 2019. The entire contents of each of the above-referenced applications are hereby incorporated by reference for all purposes.

TECHNICAL FIELD

The present document relates to a separator plate for an electrochemical system.

BACKGROUND AND SUMMARY

Known electrochemical systems usually comprise a multiplicity of separator plates which are disposed in a stack such that two adjacent separator plates enclose in each case one electrochemical cell or a humidifier cell. The separator plates can have, for example, in each case two individual plates which are connected to one another along the rear sides thereof that face away from the electrochemical cells, or the humidifier cells, respectively. The sensor plates serve, for example, to electrically contact the electrodes of the individual electrochemical cells (for example fuel cells) and/or to electrically connect adjacent cells (connection of the cells in series). The separator plates can also serve to dissipate heat which is created in the cells between the separator plates. Such exhaust heat can be created, for instance, when converting electrical or chemical energy, respectively, in a fuel cell. In the case of fuel cells, bipolar plates are often used as separator plates.

The separator plates or the individual plates of the separator plates each usually have at least one passage opening. The passage openings of the stacked separator plates, which openings are aligned or at least partially overlap with one another in the separator plate stack of the electrochemical system, then form media channels for feeding or discharging media. In order for the through openings, or the media ducts formed by the through openings of the separator plates, respectively, to be sealed, known separator plates furthermore have bead assemblies which are in each case disposed about the through opening of the separator plate.

The separator plates, or the individual plates of the separator plates, respectively, can moreover have media-directing structures for providing an active region of the separator plate with one or a plurality of media and/or for transporting away media. The media-directing structures can comprise, for example, ducts and/or webs. The active region of the separator plate can enclose or delimit an electrochemical cell or a humidifier cell. The media can be, for example, fuels (for example hydrogen or methanol), reaction gases (for example air or oxygen) or a coolant as supplied media, and reaction products and heated coolant as discharged media. In the case of fuel cells, the reaction media, that is to say the fuel and reaction gases, are usually guided on the surfaces of the individual plates that face away from one another, while the coolant is usually guided between the individual plates.

The flanks of the bead assembly, about which the through opening of the separator plate is disposed, can have one or a plurality of passages. These passages usually serve to establish a fluidic connection between the through opening of the separator plate, or the media duct formed by the through opening, respectively, and the active region of the separator plate.

A separator plate which has line ducts is known from publication DE 102 48 531 A1, for example, said line ducts adjoining the passages in the bead flank on an external side of the bead assembly and being fluidically connected to a bead interior by way of the passages in the bead flank. Guiding a medium through the bead assembly can take place in an even more targeted manner with the aid of such line ducts. As a result, the efficiency of the electrochemical system can be increased.

However, known separator plates can often not adequately meet the ever-increasing requirements in terms of efficiency.

The present invention is thus based on the object of achieving a separator plate for an electrochemical system which guarantees an ideally high efficiency of the electrochemical system.

This object is achieved by a separator plate for an electrochemical system according to claim 1, and by an electrochemical system having a multiplicity of separator plates of this type. Special design embodiments are described in the dependent claims.

Proposed is thus a separator plate for an electrochemical system, having at least one through opening for configuring a media duct for supplying media or for conducting media away, having at least one bead assembly which is disposed about the at least one through opening to seal the through opening, wherein at least one of the flanks of the bead assembly has a multiplicity of passages for directing a medium through the bead flank, and having a distributing or collecting structure for distributing media, or for collecting media, respectively, wherein the distributing or collecting structure has a multiplicity of line ducts and a multiplicity of openings. The line ducts adjoin the passages in the bead flank on an external side of the bead assembly. The passages through the bead flank can be formed, for example, by local deformations such as openings, or elevations of the separator plate in the region of the bead flank. The passages through the bead flank, or the passages in the bead flank, thus do not have to present openings. Optionally, only the wall of the bead flank may be elevated, that is to say that the respective bead flank disappears in portions, for example. It is only important that the passages can direct the medium through the bead flank. The deformations or elevations that form the passage through the bead flank can in this instance form the walls of the line duct which adjoins this passage, for example. The walls of the line duct in this instance are typically configured so as to be integral to the bead flank and transition into the latter. The openings are disposed on a side of the distributing or collecting structure that faces away from the bead assembly and, at least by way of the line ducts and the passages in the bead flank, are fluidically connected to a bead interior. The bead interior in turn is typically fluidically connected to the through opening of the separator plate, or to a media duct formed by this through opening, respectively. The openings of the distributing or collecting structure are typically provided by clearances in the separator plate, preferably by cuts or punched perforations. This relates in particular to the reactant sides, that is to say the surfaces of the separator plate that face away from one another. Should the separator plate be formed from two joined individual plates which enclose a cavity or an interior of the separator plate, said cavity or interior serving to guide a coolant, for example, the openings can also be formed by terminating ducts or ducts that transition to other flow regions, that is to say by the end of the walls that delimit a duct.

The distributing or collecting structure has a first fluid path which comprises one of the mentioned line ducts fluidically connected to one of the first mentioned openings, and the distributing or collecting structure has a second fluid path which comprises a second of the mentioned line ducts fluidically connected to a second of the mentioned openings. A minimum cross section of the first fluid path here differs from a minimum cross section of the second fluid path. The first fluid path and the second fluid path preferably do not overlap, intersect and/or cross one another.

The separator plate typically has an electrochemically active region which, by way of the distributing or collecting structure, is fluidically connected to the through opening of the separator plate, or to a media duct formed by the through opening, respectively. The distributing or collecting structure is typically disposed on a side of the bead assembly that faces away from the through opening. As a result of the minimum cross section of the first fluid path of the distributing or collecting structure differing from the minimum cross section of the second fluid path of the distributing or collecting structure, the spatial distribution of the media flow or the media stream through the distributing or collecting structure, for example from the through opening to the active region of the separator plate, or from the active region to the through opening, can be adjusted in a targeted manner.

In known separator plates which have a distributing or collecting structure of the type described here, this distributing or collecting structure is usually configured in such a manner that different fluid paths of the distributing or collecting structure have in each case identical cross sections or identical minimum cross sections such that the media flow or the media stream through the bead assembly, along the profile of the bead assembly, is typically homogenous or substantially homogenous. Depending on the special design embodiment of the separator plate, in particular depending on the geometry of the through opening, of the bead assembly and/or of the active region, such an assembly however potentially leads to an insufficiently good distribution of the media. This can at times significantly compromise the efficiency of the electrochemical system that contains the separator plate. In contrast, the distribution of media can at times be significantly improved by the design embodiment of the distributing or collecting structure proposed here, the latter comprising fluid paths having in each case different minimum cross sections. This can significantly increase the efficiency of an electrochemical system having separator plates of the type proposed here in comparison to systems having known separator plates.

The distributing or collecting structure can have at least one cross duct, wherein at least two of the line ducts of the distributing or collecting structure are fluidically connected to one another by way of the at least one cross duct. The line ducts, in a plane which is aligned so as to be parallel to the planar face plane of the separator plate, typically extend perpendicularly or substantially perpendicularly to the direction of extent or to the direction of main extent of the bead assembly. The at least one cross duct can comprise a multiplicity of cross ducts. The cross duct or the cross ducts usually runs or run, respectively, transversely to the line ducts, or at least transversely to one or to a plurality of the line ducts.

The distributing or collecting structure of the separator plate proposed here, transversely to the line ducts, can be configured so as to be aperiodic. This can also contribute towards improving the distribution of media or the collection of media. The aperiodic design embodiment of the distributing or collecting structure transversely to the line ducts can include that the openings, or at least some of the openings, of the distributing or collecting structure, transversely to the line ducts, are aperiodically disposed. For example, the spacings between adjacent and successive openings of the distributing or collecting structure can be aperiodic. Alternatively or additionally, the openings, or at least one of the openings, in a direction transverse to the line ducts can be disposed so as to be offset from the line ducts. This means that the centres, in particular the centres of gravity, of the exit of the respective line duct and of the associated opening do not coincide.

The minimum cross section of the first fluid path of the distributing or collecting structure differing from the minimum cross section of the second fluid path of the distributing or collecting structure can include that a cross section of the first opening, the latter being part of the first fluid path, differs from a cross section of the second opening, the latter being part of the second fluid path.

Alternatively or additionally, the first opening of the first fluid path and the second opening of the second fluid path can have dissimilar geometric shapes. And alternatively or additionally, the openings of the distributing or collecting structure can have one or a plurality of openings which is/are disposed at a first spacing from the bead assembly and have one or a plurality of openings which is/are disposed at a second spacing from the bead assembly, wherein the first spacing differs from the second spacing. For example, the mentioned first opening of the first fluid path and the mentioned second opening of the second fluid path can be disposed at different spacings from the bead assembly.

The minimum cross section of the first fluid path of the distributing or collecting structure being different from the minimum cross section of the second fluid path of the distributing or collecting structure can alternatively or additionally include that a minimum cross section of the first line duct of the first fluid path differs from a minimum cross section of the second line duct of the second fluid path. And alternatively or additionally, it is also conceivable that the first line duct of the first fluid path and the second line duct of the second fluid path have dissimilar geometric shapes in cross section. This can also influence the distribution of media or the collection of media in a targeted manner.

When the distributing or collecting structure transversely to the line ducts is aperiodically designed, as has been described above, this can also include that the line ducts are aperiodically disposed. For example, the spacings between adjacent line ducts can be aperiodic. Likewise, the angles of the adjacent line ducts relative to the bead flank can be aperiodic.

At least one of the line ducts of the distributing or collecting structure can have at least one discharge opening, or the openings of the distributing or collecting structure, or some of the latter, can be configured in the line ducts. Apart from openings which are configured on the periphery of the distributing or collecting structure, additional openings can thus also be present in at least one of the line ducts, or in at least one of the cross ducts, said additional openings serving to conduct water away, the latter formed as a reaction product and being present in a void that is situated between the separator plate and a membrane electrode assembly (MEA) contiguous to the separator plate or adjacent to one of the separator plates, into the line duct or cross duct, respectively, and through the latter to the through opening of the separator plate that is fluidically connected to said line duct or cross duct, or through the media duct formed by this through opening, respectively. It can be avoided in this way that the water freezes in the void. To this end, the separator plate, or the plate stack, respectively, is preferably disposed or installed such that the through opening in geodetic terms lies at a lower level than the void.

When the distributing or collecting structure transversely to the line ducts is aperiodically configured, this can also include that the at least one cross duct is aperiodically disposed. For example, the cross duct can have portions of dissimilar cross-sectional areas, in particular dissimilar heights. The transitions between portions of dissimilar heights here can also run at dissimilar inclinations. It is likewise possible that the at least one cross duct has portions of dissimilar cross-sectional shapes, for example heavily radiused and approximately trapezoidal cross-sectional shapes.

The bead assembly and the at least one cross duct can be configured in such a manner that a height of the at least one cross duct, determined perpendicularly to the planar face plane of the separator plate, is less than a height of the bead assembly, determined perpendicularly to the planar face plane of the separator plate. For example, the height of the at least one cross duct can be at least ten percent less than the height or the maximum height of the bead assembly, or at least 20 percent less than the height or the maximum height of the bead assembly. When stacking and compressing the separator plates in a plate stack of an electrochemical system, the at least one cross duct, as opposed to the bead assembly, is in this instance usually not compressed. The at least one cross section in this instance can serve to support a periphery or a reinforced periphery of a membrane or a membrane electrode assembly (MEA) disposed between adjacent separator plates of the electrochemical system.

The line ducts, or at least some of the line ducts, can be fluidically connected to one another by way of the at least one cross duct. The distributing or collecting structure can also comprise one or a plurality of further line ducts which adjoins or adjoin the cross duct or the cross ducts, respectively. The at least one further line duct can be disposed so as to be offset from the line ducts, for example. Alternatively or additionally, the at least one further line duct can have a direction of extent which is different than that of the line ducts. The openings, or at least some of the openings, of the distributing or collecting structure can be fluidically connected by way of the at least one further line duct to those line ducts that adjoin the bead assembly in the region of the passages through the bead flank.

The distributing or collecting structure can also comprise at least one further cross duct which adjoins the at least one further line duct. The openings, or at least some of the openings, of the distributing or collecting structure can thus be fluidically connected by way of the at least one further cross duct and by way of the further line duct to the line ducts, or to the passages through the bead flank, respectively.

The passages for directing a medium through the bead flank are usually disposed in a row. This row of passages in this instance usually has a first terminal passage that forms a first end of the row of passages, and a second terminal passage that forms a second end of the row of passages. The row of passages between the first terminal passage and the second terminal passage typically comprises a multiplicity of further passages. These further passages in this instance usually comprise a first further passage which is directly adjacent to the first terminal passage in the row of passages, and a second further passage which is directly adjacent to the second terminal passage in the row of passages. The first further passage in this instance thus forms a first end of the row of further passages, and the second further passage in this instance thus forms a second end of the row of further passages.

The distributing or collecting structure can be aperiodically configured in at least one portion of the distributing or collecting structure that extends transversely to the line ducts and/or along a direction of extent of the bead assembly from the first further passage to the second further passage.

The separator plate can be formed from metal, preferably from stainless steel. The separator plate can have two interconnected individual plates. It is likewise possible for the separator plate to have more than two interconnected individual plates, for example two continuous plates and, lying therebetween, a heavily perforated plate. The bead assembly and/or the distributing or collecting structure in this instance can be configured in at least one of the individual plates of the separator plate. The individual plates are usually connected to one another by way of a materially integral connection, preferably by a welded connection, for example a laser-welded connection, by a soldered connection, or by an adhesively bonded connection.

The bead assembly and/or the distributing or collecting structure can be configured so as to be integral to the separator plate or to one of the individual plates. For example, the bead assembly and/or the distributing or collecting structure can be moulded in the separator plate, for example by embossing or deep drawing.

The separator plate proposed here usually has a transition region which is disposed between the distributing or collecting structure and the electrochemically active region of the separator plate. The electrochemically active region in this instance is usually fluidically connected, by way of this transition region and by way of the distributing or collecting structure, to the through opening of the separator plate, or to the media duct formed by the through opening, respectively. The transition region can have directing structures for directing media, for example. These directing structures of the transition region can be configured so as to be integral to the separator plate. The directing structures of the transition region are preferably moulded in the separator plate, for example by embossing or deep drawing. The directing structures of the transition region typically comprise a multiplicity of ducts and/or webs.

Furthermore proposed is an electrochemical system, for example a fuel cell system, an electrochemical compressor, electrolyser, redox flow battery, or humidifier for a fuel cell system, having a multiplicity of separator plates which are of the type described above and proposed here and stacked along a stacking direction. The through openings of the separator plates in this instance are mutually aligned and form at least one media duct for supplying media or for conducting media away. The electrochemical system furthermore usually comprises at least one membrane, typically a multiplicity of membranes, of which at least one is in each case disposed between two adjacent separator plates. The membrane is usually an electrolyte membrane or a water-exchange membrane.

BRIEF DESCRIPTION OF THE FIGURES

Exemplary embodiments of the separator plate proposed here and of the electrochemical system proposed here are illustrated in the figures and will be explained in more detail by means of the description hereunder. In the drawings:

FIG. 3 schematically shows a detail of one of the known separator plates from FIG. 2, in a plan view;

FIG. 4 schematically shows a further detail of one of the separator plates from FIGS. 2 and 3, having a bead assembly with passages, and having a distributing or collecting structure of a known construction mode, in a perspective illustration;

FIG. 5 schematically shows the detail from FIG. 4 in a sectional illustration;

FIGS. 6-12 schematically show in each case a detail of a separator plate of the type proposed here, according to various embodiments, in a plan view.

DETAILED DESCRIPTION

Figure 1:
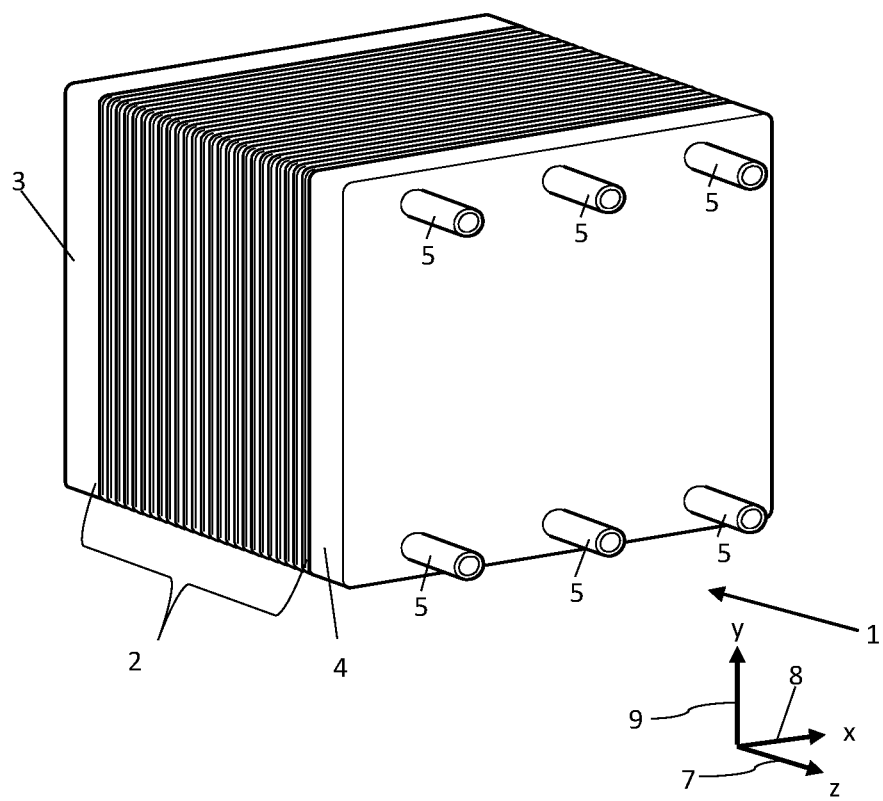
FIG. 1 schematically shows an electrochemical system having a multiplicity of stacked separator plates in a perspective illustration.

FIG. 1 shows an electrochemical system 1 having a plurality of metallic separator plates or bipolar plates 2 which are of identical construction and are disposed in a stack and stacked along a z-direction 7. The separator plates 2 of the stack are clamped between two end plates 3, 4. The z direction 7 is also called the stacking direction. In the present example, the system 1 is a fuel cell stack. Two adjacent separator plates 2 of the stack in each case thus enclose between them an electrochemical cell, which is used, e.g., for converting chemical energy into electrical energy. In order for the electrochemical cells of the system 1 to be configured, one membrane electrode assembly (MEA) is in each case disposed between adjacent separator plates 2 of the stack (cf. FIG. 2, for example). The MEA typically includes in each case at least one membrane, for example an electrolyte membrane, which is surrounded by a frame. Furthermore, a gas diffusion layer (GDL) can be disposed on one or both surfaces of the MEA.

In alternative embodiments, the system 1 can likewise be configured as an electrolyser, compressor, redox flow battery, or as a humidifier. Separator plates can likewise be used in these electrochemical systems. The construction of these separator plate in this instance can correspond to the construction of the separator plates 2 explained in more detail here, even when the media guided on or through the separator plates, respectively, in the case of an electrolyser, in the case of an electrochemical compressor, in the case of a humidifier, or in the case of a redox flow battery can in each case differ from the media used for a fuel cell system.

The z-axis 7, conjointly with an x-axis 8 and a y-axis 9, defines a right-hand Cartesian coordinate system. The separator plates 2 in each case define a plate plane, wherein the plate planes of the separator plates are each aligned parallel to the x-y plane, and thus perpendicular to the stacking direction or to the z-axis 7. The end plate 4 includes a plurality of media connections 5, via which media are suppliable to the system 1 and via which media are dischargeable out of the system 1. These media which can be supplied to the system 1 and discharged from the system 1 can comprise, for example, fuels such as molecular hydrogen or methanol, reaction gases such as air or oxygen, reaction products such as water vapour, or depleted fuels or coolants such as water and/or glycol.

Figure 2:
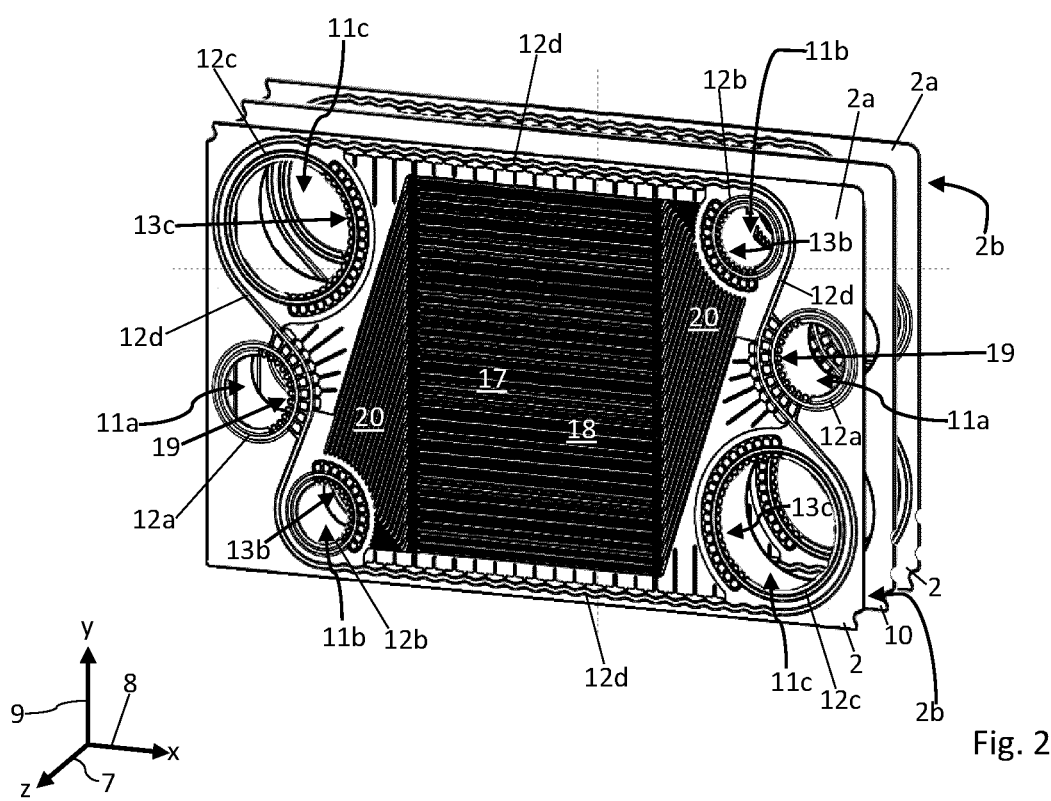
FIG. 2 schematically shows two separator plates known from the prior art for an electrochemical system of the type shown in FIG. 1, and a membrane electrode assembly that is disposed between the separator plates, in a perspective illustration.

FIG. 2 in a perspective manner shows two separator plates or bipolar plates 2 which are known from the prior art and are used, for example, in electrochemical systems of the type shown in FIG. 1. FIG. 2 furthermore shows a membrane electrode assembly (MEA) 10 disposed between these adjacent separator plates 2, wherein the MEA 10 in FIG. 2 is largely obscured by the separator plate 2 that faces the observer. Here and hereunder, features which recur in the various figures are in each case identified with the same or similar reference signs. Features having a reference sign and a suffix are associated with the group of features having the associated reference sign without a suffix. The separator plate 2 is formed from two individual plates 2a, 2b which are joined in a materially integral manner (cf. FIGS. 4 and 5, for example), of which only the first individual plate 2a that faces the observer and obscures the second individual plate 2b is in each case visible in FIG. 2. FIG. 3 shows a detail of one of the separator plates 2 from FIG. 2 in a plan view. The individual plates 2a, 2b can in each case be made from a metal sheet, for example from a stainless-steel sheet. The individual plates 2a, 2b can be welded to one another, for example by laser-welded connections.

The individual plates 2a, 2b have mutually aligned through openings which form through openings 11a-c of the separator plate 2. When a plurality of separator plates of the type of the separator plate 2 are stacked, the through openings 11a-c form media ducts which in the stacking direction 7 extend through the stack of the system 1 (cf. FIG. 1). Typically, each media duct formed by the through openings 11a-c is in each case fluidically connected to one of the ports 5 in the end plate 4 of the system 1. Coolant can be directed into the stack or be conducted away from the stack by way of the media ducts formed by the through openings 11a, for example. In contrast, the lines formed by the through openings 11b, 11c can be configured for providing the electrochemical cells of the fuel cell stack of the system 1 with fuel and with reaction gas, as well as for conducting the reaction products away from the stack.

In order for the through openings 11a-c to be sealed in relation to the interior of the stack and in relation to the environment, the first individual plates 2a have in each case sealing assemblies in the form of sealing beads 12a-c which are in each case disposed about the through openings 11a-c and which in each case completely encompass the through openings 11a-c. The second individual plates 2b, on the rear side of the separator plates 2 that faces away from the observer of FIG. 2, have corresponding sealing beads for sealing the through openings 11a-c (not shown).

In an electrochemically active area 18, the first individual plates 2a, at the front side thereof facing the observer of FIG. 2, include a flow field 17 including structures for guiding a reaction medium along the front side of the individual plate 2a. These structures in FIG. 2 are provided by a multiplicity of webs, and by ducts which run between the webs and are delimited by the webs. The first individual plates 2a, on the front side of the separator plates 2 that faces the observer of FIG. 2, moreover have in each case a transition region 20. The transition region 20 comprises structures which are specified for distributing a medium, which proceeding from a first of the two through openings 11b has been introduced into the transition region 20, across the active region 18 and/or for collecting or bundling a medium, which proceeding from the active region 18 flows towards the second of the through openings 11b. The transition region 20 has directing structures which in FIG. 2 are likewise provided by webs, and by ducts which run between the webs and are delimited by the webs.

The first individual plates 2a furthermore have in each case a further sealing assembly in the form of a perimeter bead 12d which encircles a flow field 17 of the active region 18, the transition region 20 and the through openings 11b, 11c and seals said flow field 17, said transition region 20 and said through openings 11b, 11c in relation to the through opening 11a, that is to say in relation to the coolant circuit, and in relation to the environment of the system 1. The second individual plates 2b comprise in each case corresponding perimeter beads. The structures of the active region 18, the directing structures of the transition region 20, and the sealing beads 12a-d are in each case configured so as to be integral to the individual plates 2a and moulded in the individual plates 2a, for example in an embossing or deep-drawing process. The same usually applies to the corresponding directing structures and sealing beads of the second individual plates 2b.

The two through openings 11b, or the media ducts through the plate stack of the system 1 formed by the through openings 11b, respectively, are in each case fluidically connected to openings 14b by way of passages 13b through the sealing beads 12b, and fluidically connected to one another by way of the directing structures of the transition region 20 and by way of the flow field 17 in the active region 18 of the first individual plates 2a that face the observer of FIG. 2. In an analogous manner, the two through openings 11c, or the media ducts through the plate stack of the system 1 formed by the through openings 11c, respectively, are in each case fluidically connected to one another by way of corresponding bead transitions, by way of corresponding transition regions and by way of a corresponding flow field on an external side of the second individual plates 2b that face away from the observer of FIG. 2. In contrast, the through openings 11a, or the media ducts through the plate stack of the system 1 formed by the through openings 11a, respectively, are in each case fluidically connected to one another by way of a cavity 19 that is enclosed or encompassed by the individual plates 2a, 2b. This cavity 19 serves in each case to guide a coolant through the separator plate 2, in particular for cooling the electrochemically active region 18 of the separator plate 2. The opening 14a of the cavity 19 towards the transition region 20 does not take place by way of a clearance in the separator plate 2a as is the case in the passage 13b of the through opening 11b, but the cavity 19 opens towards the transition region 20 which terminate in walls delimiting said cavity 19. In the case of the opening 14a, the coolant thus does not switch from one surface of an individual plate 2a over to the opposite surface, as is the case in the passage 13b of the through opening 11b, but the coolant continues to flow on the same surface, that is to say in the interior space of the separator plate 2.

FIG. 4 in a schematic perspective illustration shows a detail of a separator plate 2 of the type shown in FIGS. 2 and 3 and known from the prior art. The separator plate 2 according to FIG. 4 again comprises two metallic individual plates 2a, 2b which are connected to one another in a materially integral manner, for example by laser-welded connections. The separator plate 2 has a through opening 11b for configuring a media duct for supplying media or for conducting media away, as well as a bead assembly 12b. The bead assembly 12b is disposed about the through opening 11b to seal the through opening 11b. In the embodiment shown in FIG. 4, the bead assembly 12b at least in portions has an undulating profile. The lateral flanks of the bead assembly 12b, as in the separator plate shown in FIGS. 2 and 3, have a multiplicity of passages 13b which permit a medium to be directed in a metered manner through the bead assembly 12b, for example from the through opening 11b, or from the media duct formed by the through opening 11b, towards the active region 18, or in the opposite direction from the active region 18 towards the through opening 11b or towards the media duct formed by the through opening 11b. The passages 13b through the bead assembly 12b thus establish a fluidic connection between the through opening 11b and the active region 18 of the separator plate 2 (cf. FIG. 3).

In order for media to be able to be directed from the through opening 11b towards the active region 18, or from the active region 18 towards the through opening 11b in a more targeted manner and/or in an improved metered manner, the separator plate 2 according to FIG. 4, at least on the side of the bead assembly 12b that faces away from the through opening 11b, furthermore has a distributing or collecting structure 30. The distributing or collecting structure 30 comprises a multiplicity of line ducts 31, a multiplicity of cross ducts 32, and a multiplicity of openings 33. The openings 33 are disposed on a side of the distributing or collecting structure 30 that faces away from the through opening 11b and away from the bead assembly 12b such that medium can exit the distributing or collecting structure 30 at the openings 33 or enter the distributing or collecting structure 30 at the openings 33. The openings 33 thus establish a fluidic connection between the through opening 11b and the active region 18 of the separator plate 2 (cf. FIG. 3).

It can be furthermore derived from FIG. 4 that the distributing or collecting structure 30 of the separator plate 2, along the direction of main extent of the bead assembly 12b and thus transversely to the line ducts 31, has a periodic structure. In particular, the line ducts 31, the cross ducts 32 and the openings 33 are in each case configured so as to be of identical construction and disposed at periodic spacings (cf. also FIG. 3). A media flow through the bead assembly 12b that is constant or substantially constant along the direction of the profile of the bead assembly 12b is usually established in this way.

FIG. 5 shows the separator plate 2 according to FIG. 4 in a sectional illustration, wherein the section plane is aligned so as to be parallel to the x-z-plane and runs along the section line A-A highlighted in FIG. 4, said section line A-A following the profile of one of the line ducts 31. The reference sign 15 marks the transition of the line duct 31 to the bead flank in the individual plate 2a, and the reference sign 16 marks the upper edge of the line duct 31 at the end thereof that faces the opening 33, likewise in the individual plate 2a. The transition 15, as well as the upper edge 16 at the end thereof mentioned above, run in the same plane.

FIGS. 6 to 13 described hereunder show in each case a detail of a separator plate which is of the type proposed here and improved in comparison to the prior art.

Figure 6:
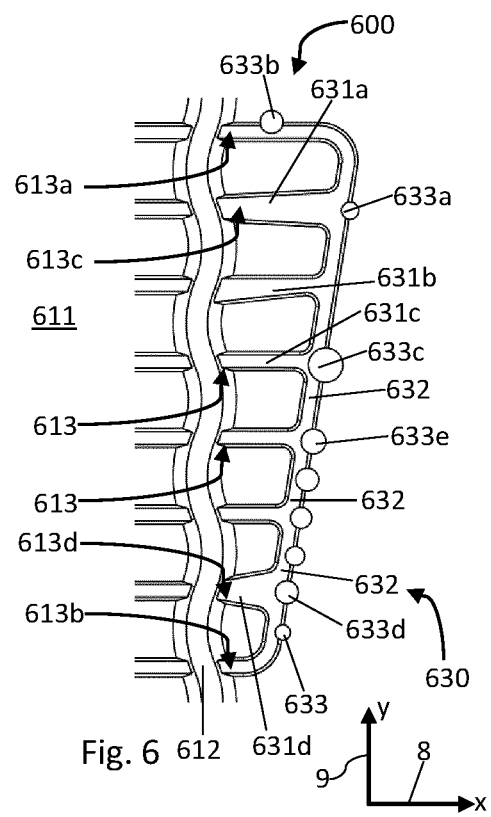

FIG. 6 shows a detail of a separator plate 600 for an electrochemical system of the type of the system 1 according to FIG. 1 and according to a first embodiment. The separator plates 2 of the system 1 according to FIG. 1, or at least some of the separator plates 2 of the system 1 according to FIG. 1, can thus be replaced by separator plates of the type of the separator plate 600 described here. The separator plate 600 is of the type of the separator plate 2 according to FIGS. 2, 3, 4 and 5. Said separator plate 600 comprises two individual plates which are connected to one another in a materially integral manner. For example, the separator plate 600 comprises two metallic individual plates, preferably from stainless steel, which are connected to one another by laser-welded connections. Like the separator plate 2 according to FIGS. 2, 3, 4 and 5, the separator plate 600 has a through opening 611 for configuring a media duct for supplying media or for conducting media away, a bead assembly 612 which is disposed about the through opening 611 to seal the through opening 611, and a distributing or collecting structure 630. The through opening 611 is merely implied in FIG. 6, and only a fragment of the bead assembly 612 is illustrated in FIG. 6. The lateral flanks of the bead assembly 612 have passages 613 for directing a medium through the bead assembly 612. The distributing or collecting structure 630 comprises line ducts of which line ducts 631*a-d* are highlighted only in an exemplary manner in FIG. 6, as well as cross ducts 632 and openings 633, wherein openings 633*a-e* are separately highlighted.

The through opening 611 according to the embodiment shown in FIG. 6 has a substantially rectangular shape with radiused end portions, for example. In alternative embodiments, the through opening 611 can however assume other shapes, for example a round shape such as the through opening 11*b* of the separator plate 2 according to FIGS. 2 and 3. The bead assembly 612 serving to seal the through opening 611 here has an undulating profile, or a profile which is undulating at least in portions. In alternative embodiments, the bead assembly 612 can however also have another profile which deviates therefrom, for example a circular profile like the bead assembly 12*b* of the separator plate 2 according to FIGS. 2 and 3. The profile of the bead assembly 612 usually substantially follows the profile of an internal edge 609 of the separator plate 600 that delimits the through opening 611.

The bead assembly 612 and the distributing or collecting structure 630 are configured so as to be integral to the separator plate 600, or to at least one of the individual plates of the separator plate 600. For example, the bead assembly 612 and the distributing or collecting structure 630 can be moulded in one of the individual plates of the separator plate 600, preferably by embossing or by deep drawing. The line ducts, including the line ducts 631*a-d*, at the flank of the bead assembly 612 that faces away from the through opening 611, adjoin the passages 613 through the bead assembly 612.

The line ducts 631*a-d* run in a straight line, or at least in portions in a straight line, and are aligned so as to be perpendicular or substantially perpendicular to the direction of extent or to the direction of main extent of the bead assembly 612. The line ducts 631 and the direction of main extent of the bead assembly 612 typically enclose in each case an angle between 70 degrees and 110 degrees, preferably an angle between 80 degrees and 100 degrees. The direction of main extent of the bead assembly 612 running in an undulating manner is defined, for example, by the shortest continuously differentiable curve on which the reversal points of a bead base 602 of the bead assembly 612 that faces the through opening lie. In the case of the portion of the bead assembly 612 shown in FIG. 6, this is, for example, a straight line which runs parallel to the internal edge 609 of the through opening 611 that faces the bead assembly 612, and thus runs parallel or substantially parallel to the y-direction 9. The line ducts 631*a-d* in FIG. 6 thus extend along or substantially along the x-direction 8. Some of the line ducts, such as the line duct 631*c*, for example, along the direction of the profile thereof, that is to say along the x-direction 8, have a constant or substantially constant cross section, wherein this cross section is determined in a plane which is aligned so as to be parallel to the y-z-plane and thus perpendicular to the planar face plane of the separator plate 600. In the separator plate 600, the line ducts are furthermore disposed at approximately regular mutual spacings along the direction of main extent of the bead assembly 612, that is to say along the y-direction 9 in FIG. 6. In other words, adjacent line ducts, for example the line ducts 631*a* and 631*b* as well as the line ducts 631*b* and 631*c* in FIG. 6, have in each case the same mutual spacing.

The cross ducts 632 run transversely to the line ducts 631; in the embodiment according to FIG. 6, said cross ducts 632 and the y-direction 9 enclose an angle of approximately 20 degrees and establish a fluidic connection between the line ducts 631. Two adjacent line ducts 631 in FIG. 6 are in each case fluidically connected to one another by one of the cross ducts 632. The bead assembly 612, the line ducts 631 and the cross ducts 632 are configured in such a manner that a height of the line ducts 631 and of the cross ducts 632, determined perpendicularly to the planar face plane of the separator plate 600 and thus along the z-direction 7, is less than a height of the bead assembly 612 determined perpendicularly to the planar face plane of the separator plate. For example, the maximum height of the line ducts 631 and of the cross ducts 632 is in each case at least 10 percent or at least 20 percent less than the maximum height of the bead assembly 612.

The openings 633 of the distributing or collecting structure 630 are disposed on an end of the distributing or collecting structure 630 that faces away from the bead assembly 612 and away from the through opening 611. The openings 633 establish a fluidic connection between the through opening 611 and an active region of the separator plate 600, said active region being of the type of the active region 18 of the separator plate 2 according to FIGS. 2 and 3, for example. The openings 633 are in particular fluidically connected to an interior space of the bead assembly 612, the latter in turn being fluidically connected to the through opening 611. As is the case in the separator plate 2 according to FIGS. 2 and 3, a transition region having media-directing structures can be disposed between the distributing or collecting structure 630 and the active region of the separator plate 600 in the separator plate 600 according to FIG. 6. These media-directing structures can comprise, for example, a multiplicity of ducts and/or webs. The media-directing structures of the transition region of the separator plate 600 can also be configured so as to be integral to the separator plate 600 or to one of the individual plates of the separator plate 600. For example, the media-directing structures of the transition region of the separator plate 600 can be moulded in one of the individual plates of the separator plate 600, preferably by embossing or by deep-drawing.

The openings 633 of the distributing or collecting structure 630 are provided by clearances in the separator plate 600 or in one of the individual plates of the separator plate 600. In alternative embodiments, the openings 633 can however also be in each case provided by an incision in the separator plate 600 or in one of the individual plates of the separator plate 600 and by a deformation. In the embodiment shown in FIG. 6, the openings 633 have in each case a round or circular shape.

The improved separator plate 600 according to FIG. 6 differs from the separator plate 2 shown in FIGS. 2 to 5 and known from the prior art in particular in that the distributing or collecting structure 630 of the separator plate 600 has different fluid paths having in each case dissimilar minimum cross sections. The distributing or collecting structure 630 thus has a first fluid path which comprises the line duct 631a and the opening 633a, and the distributing or collecting structure 630 has a second fluid path which comprises the line duct 631c and the opening 633c, wherein a minimum cross section of the first fluid path differs from a minimum cross section of the second fluid path. The first fluid path and the second fluid path represent in each case a fluidic connection between the through opening 611 and the mentioned active region of the separator plate 600, said active region not being explicitly illustrated in FIG. 6. For example, the minimum cross section of the first fluid path having the line duct 631a and the opening 633a is defined by the cross section of the opening 633a, and the minimum cross section of the second fluid path having the line duct 631c and the opening 633c is defined by the cross section of the opening 633d, wherein the cross sections of the openings 633a, 633c differ from one another. As a result of the first fluid path and the second fluid path having dissimilar minimum cross sections, a spatial distribution of a media flow through the distributing or collecting structure 630 can be adjusted or controlled in a targeted manner. The distribution of a medium guided through the through opening 611 to the active region of the separator plate 600 can be optimised in this way. This can contribute towards an improvement in terms of the efficiency of the electrochemical system in which the separator plate 600 is disposed.

The line ducts 631 in FIG. 6 at least in part have dissimilar minimum cross sections. For example, the minimum cross section of the line duct 631a of the first fluid path differs from the minimum cross section of the line duct 631c of a third fluid path, the latter apart from the line duct 631c comprising the opening 633c. The distributing or collecting structure 630 of the separator plate 600 according to FIG. 6 has line ducts which along the profile thereof have a variable cross section, such as the line ducts 631a, 631b and 631d, for example. The cross section of the line ducts 631a, 631d increases in a direction pointing away from the bead assembly 612, while the cross section of the line duct 631b increases towards the bead assembly 612. And the distributing or collecting structure 630 likewise has line ducts which along the profile thereof have a constant or a substantially constant cross section, such as the line duct 631c, for example.

The separator plate 600 according to FIG. 6 differs from the separator plates 2 of FIGS. 2 to 5 furthermore in that the distributing or collecting structure 630 of the separator plate 600 transversely to the line ducts 631 or along the direction of main extent of the bead assembly 612, thus along the y-direction 9 in FIG. 6, is configured so as to be aperiodic. This aperiodic design embodiment of the distributing or collecting structure 630 can additionally serve to establish a media flow or media stream through the bead assembly 612 that is variable or non-constant along the direction of extent of the bead assembly 612.

The aperiodicity of the distributing or collecting structure 630 according to FIG. 6 comprises the aperiodic disposal of the openings 633 transversely to the line ducts 631 or along the direction of extent of the bead assembly 612, thus along the y-direction 9 in FIG. 6. This includes that adjacent openings 633 have dissimilar mutual spacings. For example, in FIG. 6 a first spacing between the adjacent openings 633a, 633c, determined transversely to the line ducts 631 or along the direction of extent of the bead assembly 612, differs from a second spacing between the adjacent openings 633c, 633e, determined transversely to the line ducts 631 or along the direction of extent of the bead assembly 612. Furthermore, the opening 633c is aligned with the line duct 631c, whereas other ones of the openings 633, for example, along a direction transverse to the line ducts 631 or along the direction of extent of the bead assembly 612, are disposed so as to be offset from the line ducts 631.

The aperiodicity of the distributing or collecting structure 630 according to FIG. 6 furthermore comprises the disposal of at least some of the openings 633 at dissimilar spacings from the bead assembly 612. For example, openings 633c, 633d are disposed at dissimilar spacings from the bead assembly 612, wherein this spacing in FIG. 6 is determined along the x-direction and thus transversely to the direction of extent of the bead assembly 612. The passages 613 through the bead assembly 612 which lead through the bead flank of the bead assembly 612 that faces away from the through opening 611 are disposed in a row. Passages 613a and 613b here form a first end and a second end of this row of passages 613. A passage 613c is directly adjacent to the passage 613a in the row of passages 613, and a passage 613d is directly adjacent to the passage 613b in the row of passages 613. The passages 613c and 613d in FIG. 6, when viewed from the top to the bottom, thus form the second and the penultimate passage in the row of passages 613. The distributing or collecting structure 630 transversely to the line ducts 631 or along the direction of main extent of the bead assembly 612, in particular also in that portion of the distributing or collecting structure 630 that extends from the passage 613c to the passage 613d, is configured so as to be aperiodic. This aperiodic portion of the distributing or collecting structure 630 comprises in particular the line ducts 631a and 631d, as well as the line ducts 631, cross ducts 632 and openings 633 of the distributing or collecting structure 630 that are disposed along the direction of extent of the bead assembly 612, that is to say along the y-direction 9, between the line ducts 631a, 631d.

It is of course, conceivable for the distributing or collecting structure 630 in alternative embodiments to have an arbitrary selection or arbitrary combinations of the features described above.

Figure 7:
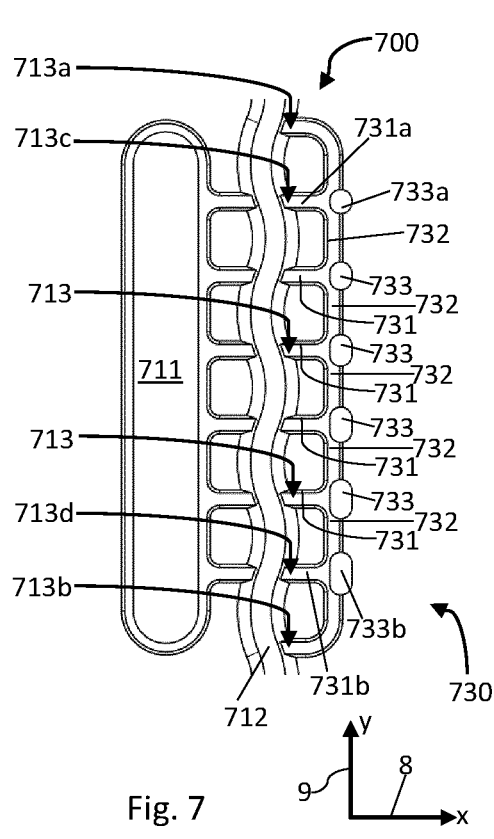

FIG. 7 shows a detail of a separator plate 700 for an electrochemical system of the type of the system 1 according to FIG. 1 and according to a further embodiment. The separator plates 2 of the system 1 according to FIG. 1, or at least some of the separator plates 2 of the system 1 according to FIG. 1, can thus be replaced by separator plates of the type of the separator plate 700 described here. The separator plate 700 according to FIG. 7 has the same or similar features as the separator plate 600 according to FIG. 6. Like the separator plate 600, the separator plate 700 has a through opening 711 for configuring a media duct for supplying media or for conducting media away, and a bead assembly 712 which is disposed about the through opening 711 to seal the through opening 711, passages 713 through the bead assembly 712, and a distributing or collecting structure 730. The distributing or collecting structure 730 comprises line ducts 731, cross ducts 732 and openings 733. The distributing or collecting structure 730 has different fluid paths having in each case dissimilar minimum cross sections, for example a first fluid path which comprises a line duct 731a and an opening 733a, and a second fluid path which comprises a line duct 731b and an opening 733b. The first fluid path and the second fluid path have dissimilar minimum cross sections. Furthermore, the distributing or collecting structure 730 of the separator plate 700 transversely to the line ducts 731 or along the direction of main extent of the bead assembly 712, thus along the y-direction 9 in FIG. 7, is configured so as to be aperiodic, the first and the second terminal passage 713a, 713b in each case transitioning to a line duct 731a, 731b of the distributing or collecting structure, said line ducts 731a, 731b having an opening 733a or 733b, respectively, only conjointly with the respective adjacent further line duct 731c or 731d, respectively.

The separator plate 700 according to FIG. 7 differs from the separator plate 600 shown in FIG. 6 in particular in that a minimum cross section of the first fluid path having the line duct 731a and the opening 733a is defined by the minimum cross section of the line duct 731a, and that the minimum cross section of the second fluid path having the line duct 731b and the opening 733b is defined by the minimum cross section of the line duct 731b, wherein the cross sections of the line ducts 731a, 731b differ from one another. Furthermore, the distributing or collecting structure 730 according to FIG. 7 has openings 733 which have dissimilar geometric shapes. For example, the openings 733 in FIG. 7 are configured so as to be oval or rectangular having radiused corners or end portions, wherein the ratio of length to width however differs in the different openings 733. For example, the opening 733a is substantially circular, whereas the maximum length in the case of the opening 733b is at least double the maximum width.

In the separator plate 700 according to FIG. 7 the design embodiment of the cross-sectional areas of the different line ducts 731 transversely to the line ducts or along the direction of main extent of the bead assembly 712 is aperiodic, wherein the cross-sectional areas of the line ducts 731 are again in each case determined in a plane perpendicular to the planar face plane of the separator plate 700, along the y-z-plane in FIG. 7. In the embodiment shown in FIG. 7, the first cross-sectional area of the line duct 731b is at least four times the size of the second cross-sectional area of the second line duct 731a, for example. The line ducts 731 in FIG. 7 are furthermore configured in such a manner that the cross-sectional area thereof transversely to the line ducts or transversely to the direction of extent of the bead assembly 712, that is to say along the y-direction 9, at least in portions decreases in a monotonous or strictly monotonous manner.

In the separator plate 700 according to FIG. 7 the cross-sectional areas of the line ducts 731, or of at least some of the line ducts 731, moreover have dissimilar geometric shapes. Because the line ducts 731 of the separator plate 700 according to FIG. 7 have the same height, determined perpendicularly to the planar face plane of the separator plate 700, said line ducts 731 by virtue of the dissimilar cross-sectional areas thereof also have in each case dissimilar aspect ratios. The aspect ratio here is to describe the ratio between the height and the width of the respective line duct. For example, the ratio between the height H and the width B of the first line duct 731b is approximately H/B=1/4, for example, and the ratio between the height H and the width B of the second line duct 731a is approximately H/B=1/1, for example.

It is of course conceivable for the distributing or collecting structure 730 in alternative embodiments to have an arbitrary selection or arbitrary combinations of the features described above.

Figure 8:
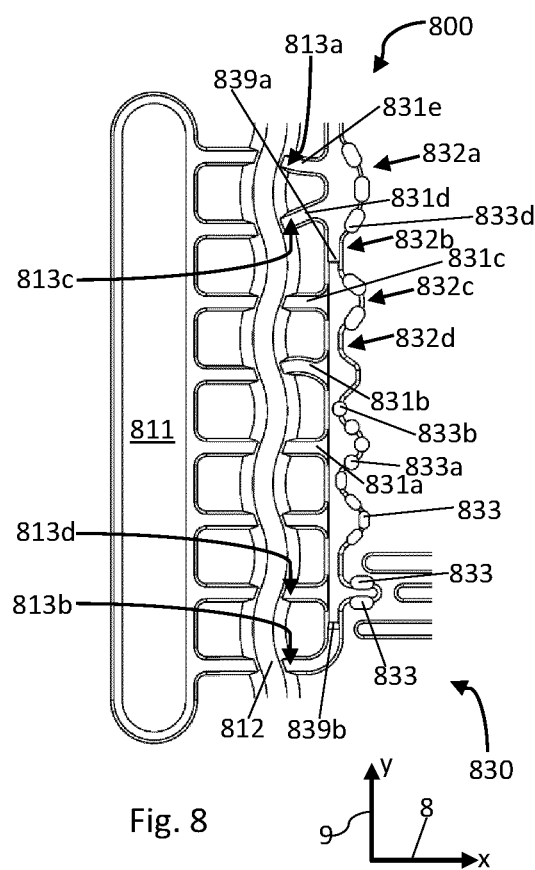
Figure 13A:
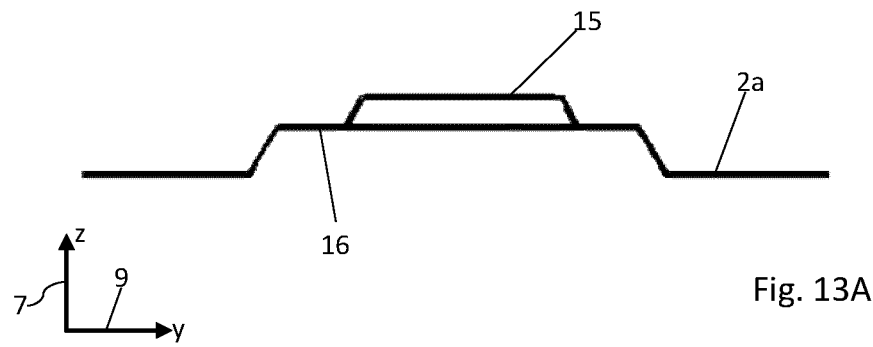
FIGS. 13A-D schematically show in each case a plan view onto an internal edge of an opening of an individual plate of a separator plate in various embodiments.
Figure 13B:
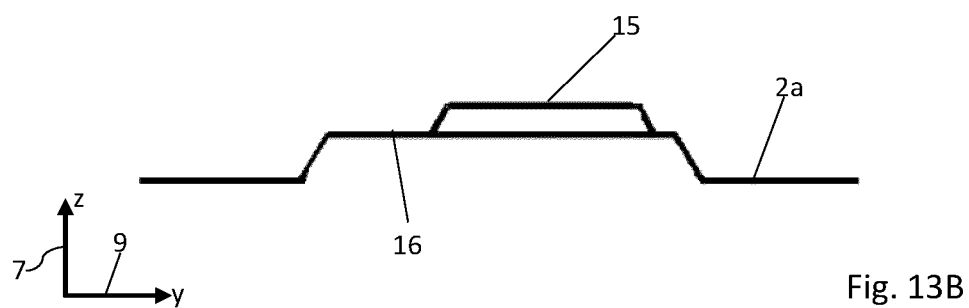
Figure 13C:
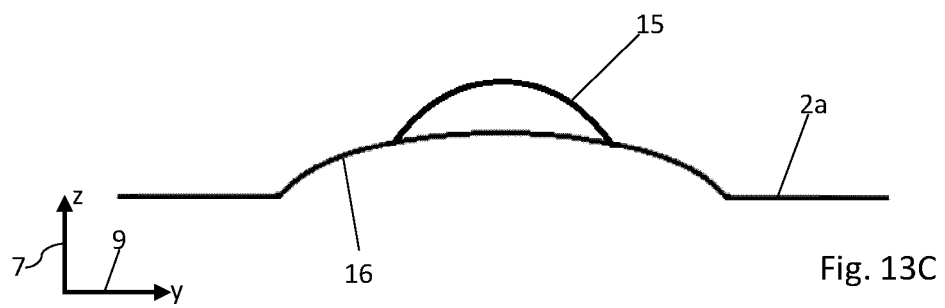
Figure 13D:
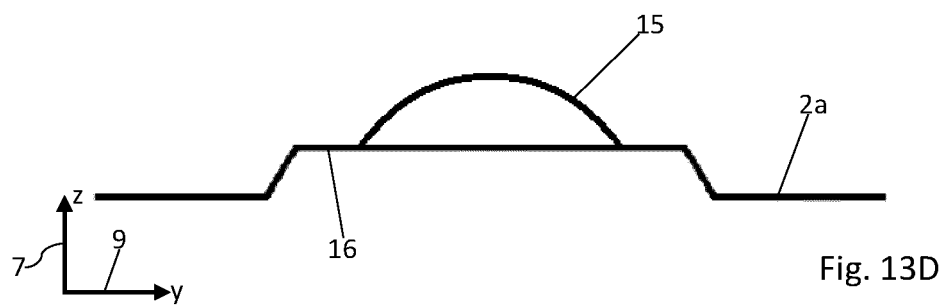

FIG. 8 shows a detail of a separator plate 800 for an electrochemical system of the type of the system 1 according to FIG. 1 and according to a further embodiment. The separator plates 2 of the system 1 according to FIG. 1, or at least some of the separator plates 2 of the system 1 according to FIG. 1, can thus be replaced by separator plates of the type of the separator plate 800 described here. The separator plate 800 according to FIG. 8 has the same or similar features as the separator plates 600, 700 according to FIGS. 6 and 7. Like the separator plates 600, 700, the separator plate 800 has a through opening 811 for configuring a media duct for supplying media or for conducting media away, a bead assembly 812 which is disposed about the through opening 811 to seal the through opening 811, passages 813 through the bead assembly 812, and a distributing or collecting structure 830. The distributing or collecting structure 830 comprises line ducts 831, cross ducts 832, and openings 833. The distributing or collecting structure 830 has different fluid paths having in each case dissimilar minimum cross sections, for example a first fluid path which comprises a line duct 831a and an opening 833a, and a second fluid path which comprises a line duct 831b and an opening 833b. The first fluid path and the second fluid path have dissimilar minimum cross sections. Moreover, the distributing or collecting structure 830 of the separator plate 800 transversely to the line ducts 831 or along the direction of main extent of the bead assembly 812, thus along the y-direction 9 in FIG. 8, is configured so as to be aperiodic.

The separator plate 800 according to FIG. 8 differs from the separator plates 600, 700 shown in FIGS. 6 and 7 in particular in that the line ducts 831 transversely to the line ducts 831 or along the direction of main extent of the bead assembly 812 are aperiodically disposed. This includes, for example, that adjacent line ducts 831 have dissimilar mutual spacings. For example, in FIG. 8 a first spacing between the adjacent line ducts 831a, 831b, determined transversely to the line ducts 831 or along the direction of extent of the bead assembly 812, differs from a second spacing between the adjacent line ducts 831b, 831c, determined transversely to the line ducts 831 or along the direction of extent of the bead assembly 812. Furthermore, the line duct 831c runs substantially along the x-direction 8, for example, whereas the line ducts 831d, 831e and the x-direction 8 enclose in each case an angle of more than 5 degrees or of more than 10 degrees, for example.

The separator plate 800 according to FIG. 8 furthermore differs from the separator plates 600, 700 shown in FIGS. 6 and 7 in that the aperiodicity of the distributing or collecting structure 830 according to FIG. 8 comprises that different line ducts, for example the line ducts 831c, 831d, 831e run at dissimilar angles relative to the direction of extent of the bead assembly 812, thus relative to the y-direction 9 in FIG. 8. It is however not only the angles of the line ducts 831 relative to the y-direction 9 that differ between the line ducts. While the line ducts 831a, 831c have a substantially rectilinear profile having a symmetrical widening towards the cross duct 832, the line duct 831b runs in an arcuate shape. The line duct 831d does indeed run in a rectilinear manner, but an asymmetrical widening towards the cross duct 832 results by virtue of the angled profile of the line duct 831d relative to the direction of main extent of the bead assembly 812. The separator plate 800 according to FIG. 8 thus furthermore differs from the separator plates 600, 700 shown in FIGS. 6 and 7 in that the aperiodicity of the distributing or collecting structure 830 according to FIG. 8 comprises a further feature according to which different line ducts, for example the line ducts 831a, 831b, 831c and 831d along the respective profile thereof extend in dissimilar directions, that is to say that, in a projection along the z-direction onto the planar face plane of the separator plate 800, the different line ducts 831 cannot be brought to be mutually congruent by being displaced in parallel in the planar face plane of the separator plate 800.

The separator plate 800 according to FIG. 8 furthermore differs from the separator plates 600, 700 shown in FIGS. 6 and 7 in that the cross ducts 832 along the profile direction thereof, thus along the y-direction 9 in FIG. 8, have a variable cross section, wherein this cross section is determined perpendicularly to the planar face plane of the separator plate 800, thus parallel to the x-z-plane in FIG. 8, for example. The cross ducts 832 thus have first portions 832a with an enlarged cross section and second portions 832b with a reduced cross section, for example. The same applies to the third portions 832c having an enlarged cross section and to fourth portions 832d having a reduced cross section. The afore-mentioned dissimilar cross-sectional areas in the embodiment according to FIG. 8 are primarily based on variations of the cross section in the x-direction, that is to say perpendicular or substantially perpendicular to the direction of main extent of the bead assembly 812. The cross ducts 832 furthermore have portions of dissimilar heights, thus dissimilar extents in the z-direction. The respective transitions are identified by 839a and 839b in FIG. 8. The fourth portion 832d thus has a larger cross-sectional area than the second portion 832b, and the third portion 832c has a larger cross-sectional area than the first portion 832a. The separator plate 800 according to FIG. 8 thus furthermore differs from the separator plates 600, 700 shown in FIGS. 6 and 7 in that the aperiodicity of the distributing or collecting structure 830 according to FIG. 8 comprises a further feature according to which the cross duct or the cross ducts 832 have portions having dissimilar cross-sectional areas. Moreover, the two transitions 839a and 839b are of dissimilar configuration, specifically having dissimilar inclinations relative to the planar face plane of the separator plate 800 such that an aperiodicity of the distributing or collecting structure 830 transversely to the line ducts 831 or along the direction of main extent of the bead assembly 812 is also derived here as a result.

Furthermore, the portions 832a-d of the cross ducts 832, in terms of the line ducts 831 and transversely to the line ducts 831, are at least in part aperiodically disposed. Of course it is conceivable for the distributing or collecting structure 830 in alternative embodiments to have an arbitrary selection or arbitrary combinations of the features described above.

FIG. 9 shows a detail of a separator plate 900 for an electrochemical system of the type of the system 1 according to FIG. 1 and according to a further embodiment. The separator plates 2 of the system 1 according to FIG. 1, or at least some of the separator plates 2 of the system 1 according to FIG. 1, can thus be replaced by separator plates of the type of the separator plate 900 described here. The separator plate 900 according to FIG. 9 has the same or similar features as the separator plates 600, 700, 800 according to FIGS. 6, 7 and 8. Like the separator plates 600, 700, 800, the separator plate 900 has a through opening 911 for configuring a media duct for supplying media or for conducting media away, a bead assembly 912 which is disposed about the through opening 911 to seal the through opening 911, passages 913 through the bead assembly 912, and a distributing or collecting structure 930. The distributing or collecting structure 930 comprises line ducts 931, cross ducts 932 and openings 933. The distributing or collecting structure 930 has different fluid paths having in each case dissimilar minimum cross sections, for example a first fluid path which comprises a line duct 931a and an opening 933a, and a second fluid path which comprises a line duct 931b and an opening 933b. The first fluid path and the second fluid path have dissimilar minimum cross sections. The distributing or collecting structure 930 of the separator plate 900 transversely to the line ducts 931 or along the direction of main extent of the bead assembly 912, thus along the y-direction 9 in FIG. 9, is configured so as to be aperiodic.

The different openings 933, transversely to the line ducts 931 or along the direction of extent of the bead assembly 912, thus have different mutual spacings, at least slightly dissimilar spacings from the bead assembly 912, dissimilar cross-sectional areas and dissimilar geometric shapes. For example, the openings 933 can be circular, oval, dumbbell-shaped, triangular, quadrangular, trapezoidal, polygonal, angular having radiused corners, or cordate, as is illustrated in the exemplary manner in FIG. 9; however, any other shapes are conceivable for the openings 933. Furthermore, the line ducts 931 transversely to the line ducts or along the direction of extent of the bead assembly 912, thus along the y-direction 9 in FIG. 9, are at least in part disposed at dissimilar mutual spacings and have at least in part dissimilar lengths or dissimilar orientations.

The separator plate 900 according to FIG. 9 differs from the separator plates 600, 700, 800 shown in FIGS. 6, 7 and 8 inter alia also in that some of the line ducts 931 have discharge openings 934, in particular for admitting water from the intermediate space between the separator plate 900 and an adjacent MEA, not illustrated here, in to the respective line ducts 931, wherein the discharge openings 934 of different line ducts 931 can again have different cross-sectional areas and/or different geometric shapes. The disposal and/or the shape of the discharge openings 934 in the line ducts 931 of the embodiment shown transversely to the line ducts 931 or along the direction of extent of the bead assembly 912 here is aperiodic. Of course it is conceivable for the distributing or collecting structure 930 in alternative embodiments to have an arbitrary selection or arbitrary combinations of the features described above.

FIG. 10 shows a detail of a separator plate 1000 for an electrochemical system of the type of the system 1 according to FIG. 1 and according to a further embodiment. The separator plates 2 of the system 1 according to FIG. 1, or at least some of the separator plates 2 of the system 1 according to FIG. 1, can thus be replaced by separator plates of the type of the separator plate 1000 described here. The separator plate 1000 according to FIG. 10 has the same or similar features as the separator plates 600, 700, 800, 900 according to FIGS. 6, 7, 8 and 9. Like the separator plates 600, 700, 800, 900, the separator plate 1000 has a through opening 1011 for configuring a media duct for supplying media or for conducting media away, a bead assembly 1012 which is disposed about the through opening 1011 to seal the through opening 1011, passages 1013 through the bead assembly 1012, and a distributing or collecting structure 1030. The distributing or collecting structure 1030 comprises line ducts 1031, cross ducts 1032 and openings 1033. The distributing or collecting structure 1030 has different fluid paths having in each case dissimilar minimum cross sections, for example a first fluid path which comprises a line duct 1031a and an opening 1033a, and a second fluid path which comprises a line duct 1031e and an opening 1033e. The first fluid path and the second fluid path have dissimilar minimum cross sections. The distributing or collecting structure 1030 of the separator plate 1000 transversely to the line ducts 1031 or along the direction of main extent of the bead assembly 1012, thus along the y-direction 9 in FIG. 10, is configured so as to be aperiodic.

The openings 1033, transversely to the line ducts 1031 or along the direction of extent of the bead assembly 1012, thus have different mutual spacings, at least slightly dissimilar spacings from the bead assembly 1012, dissimilar cross-sectional areas and dissimilar geometric shapes.

The separator plate 1000 according to FIG. 10 differs from the separator plates 600, 700, 800, 900 shown in FIGS.

6, 7, 8 and 9 inter alia in that not all of the line ducts 1031 are fluidically connected to one another by cross ducts 1032, wherein the disposal of the cross ducts 1032 transversely to the line ducts 1031 or along the direction of extent of the bead assembly 1012 is aperiodic. For example, the adjacent line ducts 1031a, 1031b, 1031c are connected to one another by way of cross ducts 1032a, 1032b, whereas the adjacent line ducts 1031c, 1031d are not fluidically connected to one another by way of a corresponding cross duct. Of course it is conceivable for the distributing or collecting structure 1030 in alternative embodiments to have an arbitrary selection or arbitrary combinations of the features described above.

FIG. 11 shows a detail of a separator plate 1100 for an electrochemical system of the type of the system 1 according to FIG. 1 and according to a further embodiment. The separator plates 2 of the system 1 according to FIG. 1, or at least some of the separator plates 2 of the system 1 according to FIG. 1, can thus be replaced by separator plates of the type of the separator plate 1100 described here. The separator plate 1100 according to FIG. 11 has the same or similar features as the separator plates 600, 700, 800, 900, 1000 according to FIGS. 6, 7, 8, 9 and 10. Like the separator plates 600, 700, 800, 900, 1000, the separator plate 1100 has a through opening 1111 for configuring a media duct for supplying media or for conducting media away, a bead assembly 1112 which is disposed about the through opening 1111 to seal the through opening 1111, passages 1113 through the bead assembly 1112, and a distributing or collecting structure 1130. The distributing or collecting structure 1130 comprises line ducts 1131, cross ducts 1132 and openings 1133. The distributing or collecting structure 1130 has different fluid paths having in each case dissimilar minimum cross sections, for example a first fluid path which comprises a line duct 1131a and an opening 1133a, and a second fluid path which comprises a line duct 1131b and an opening 1133b. The first fluid path and the second fluid path have dissimilar minimum cross sections. The distributing or collecting structure 1130 of the separator plate 1100 transversely to the line ducts 1131 or along the direction of main extent of the bead assembly 1112, thus along the y-direction 9 in FIG. 11, is configured so as to be aperiodic.

The separator plate 1100 according to FIG. 11 differs from the separator plates 600, 700, 800, 900, 1000 shown in FIGS. 6, 7, 8, 9 and 10 inter alia by further line ducts 1135 which adjoin some of the cross ducts 1132 and from the cross ducts 1132 extend in a direction that faces away from the bead assembly 1112 and from the through opening 1111. The separator plate 1100 furthermore has further cross ducts 1136 which adjoin further line ducts 1135. The openings 1133 in FIG. 11 are disposed on sides or ends of the further line ducts 1135 and of the further cross ducts 1136 that face away from the bead assembly 1112 and from the through opening 1111. The further line ducts 1135 and the further cross ducts 1136 transversely to the line ducts 1131 or along the direction of extent of the bead assembly 1112 are aperiodically disposed. For example, the further line ducts 1135 in FIG. 11 have dissimilar cross sections. Furthermore, one of the further line ducts 1135 illustrated is disposed so as to be aligned with one of the line ducts 1131, while one other of the further line ducts 1135 transversely to the line ducts 1131 or along the direction of extent of the bead assembly 1112 is disposed so as to be offset from the nearest line ducts 1131.

Of course it is conceivable for the distributing or collecting structure 1130 in alternative embodiments to have an arbitrary selection or arbitrary combinations of the features described above.

FIG. 12 shows a detail of a separator plate 1200 for an electrochemical system of the type of the system 1 according to FIG. 1 and according to a further embodiment. The separator plates 2 of the system 1 according to FIG. 1, or at least some of the separator plates 2 of the system 1 according to FIG. 1, can thus be replaced by separator plates of the type of the separator plate 1200 described here. The separator plate 1200 according to FIG. 12 has the same or similar features as the separator plates 600, 700, 800, 900, 1000, 1100 according to FIGS. 6, 7, 8, 9, 10 and 11. Like the separator plates 600, 700, 800, 900, 1000, 1100, the separator plate 1200 has a through opening 1211 for configuring a media duct for supplying media or for conducting media away, a bead assembly 1212 which is disposed about the through opening 1211 to seal the through opening 1211, passages 1213 through the bead assembly 1212, and a distributing or collecting structure 1230. The distributing or collecting structure 1230 comprises line ducts 1231, cross ducts 1232 and openings 1233. The distributing or collecting structure 1230 has different fluid paths having in each case dissimilar minimum cross sections, for example a first fluid path which comprises a line duct 1231a, the three openings 1233a to 1233c which by way of a further line duct 1235a as well as by way of a widened region 1237 which is part of this further line duct 1235a are connected to said further line duct 1235a, and the opening 1233d which by way of the cross duct 1232a is connected to the line duct 1231a, and a second fluid path which comprises a line duct 1231e and two openings 1233f and 1233g which are connected by way of a further line duct 1235b. The first fluid path and the second fluid path have dissimilar minimum cross sections. The distributing or collecting structure 1230 of the separator plate 1200 transversely to the line ducts 1231 or along the direction of main extent of the bead assembly 1212, thus along the y-direction 9 in FIG. 12, is configured so as to be aperiodic.

The separator plate 1200 according to FIG. 12 differs from the separator plates 600, 700, 800, 900, 1000, 1100 shown in FIGS. 6, 7, 8, 9, 10 and 11 inter alia by the two further line ducts 1235a and 1235b which have already been mentioned and adjoin the cross ducts 1232a and 1232b and from the cross ducts 1232a, 1232b extend in a direction that faces away from the bead assembly 1212 and from the through opening 1211. The direction of extent here however also has a large proportion running in a direction which is perpendicular to the above direction, that is to say in the y-direction. The further line duct 1235a here has portions which proportionally extend in the positive y-direction and other portions having a directional proportion in the negative y-direction. At least one further line duct 1235a, 1235b thus has a direction of extent which is different from that of the line ducts 1231. Moreover, the further line ducts 1235 in FIG. 12 have dissimilar cross sections, in particular in the form of the widened region 1237 of the further line duct 1235a. All of the openings 1233a to 1233g in the y-direction 9 have dissimilar spacings from the axes of extent of the line ducts 1231a to 1231e. The further line duct 1235b furthermore has a discharge opening 1234 similar to that of the separator plate 900 in FIG. 9.

It is of course conceivable for the distributing or collecting structure 1230 in alternative embodiments to have an arbitrary selection or arbitrary combinations of the features described above.

FIG. 13 in four partial images 13A, 13B, 13C and 13D shows schematic plan views in the x-direction 8 on to the internal edge of an opening 33 of an individual plate 2a of a separator plate 2; different cross-sectional shapes of a line duct 31 are illustrated here, as well as the variation of said line duct 31 between the transition of the line duct 31 to the bead flank, the corresponding contour being illustrated using the reference sign 15, and the end of said line ducts 31 that faces the opening 33, the corresponding contour being marked by the reference sign 16. FIGS. 13A and 13B here show in each case trapezoidal cross sections which widen towards the opening 33, wherein the profile between the reference signs 15 and 16 in FIG. 13A is symmetrical and in FIG. 13B is asymmetrical. In contrast, FIG. 13C shows radiused cross sections, wherein asymmetrical widening takes place between the cross section 15 and the cross section 16. FIG. 13D illustrates this transition from a radiused cross section 15 on the bead flank to a trapezoidal cross section 16 on the internal edge.

The invention claimed is:

1. A separator plate for an electrochemical system, comprising:
    at least one through opening for configuring a media duct for supplying media or for conducting media away;
    at least one bead assembly which is disposed about the at least one through opening to seal the through opening, wherein at least one flank of the bead assembly has passages for directing a medium through the at least one flank of the bead assembly; and
    a distributing or collecting structure for distributing media, or for collecting media, respectively, wherein the distributing or collecting structure has a multiplicity of line ducts and a multiplicity of openings;
    wherein the line ducts adjoin the passages in the at least one flank of the bead assembly on an external side of the bead assembly;
    wherein the openings are disposed on a side of the distributing or collecting structure that faces away from the bead assembly and the openings are fluidically connected to a bead interior, at least by way of the line ducts and the passages in the at least one flank of the bead assembly;
    wherein the distributing or collecting structure has a first fluid path which comprises a first line duct fluidically connected to a first opening, and has a second fluid path which comprises a second line duct fluidically connected to a second opening;
    wherein a minimum cross section of the first fluid path differs from a minimum cross section of the second fluid path; and
    wherein the distributing or collecting structure has at least one cross duct, and wherein at least two of the line ducts are fluidically connected to one another by way of the at least one cross duct.

2. The separator plate according to claim 1, wherein a cross section of the first opening differs from a cross section of the second opening.

3. The separator plate according to claim 1, wherein at least some of the openings transverse to the line ducts are aperiodically disposed.

4. The separator plate according to claim 1, wherein at least one of the openings is disposed so as to be offset from the line ducts, and or
    wherein the first opening and the second opening have different geometric shapes, and/or
    wherein the openings have one or a plurality of openings which are disposed at a first spacing from the bead assembly, and the openings have one or a plurality of openings which are disposed at a second spacing from the bead assembly, wherein the first spacing differs from the second spacing, and/or
    wherein a minimum cross section of the first line duct differs from a minimum cross section of the second line duct, and/or
    wherein the line ducts are aperiodically disposed, and/or
    wherein the first line duct and the second line duct have different geometries in cross section.

5. The separator plate according to claim 1, wherein at least one of the line ducts has at least one discharge opening.

6. The separator plate according to claim 1, wherein a height of the at least one cross duct, determined perpendicularly to a planar face plane of the separator plate, is less than a height of the bead assembly, determined perpendicularly to the planar face plane of the separator plate.

7. The separator plate according to claim 1, wherein all line ducts are fluidically connected to one another by way of the at least one cross duct.

8. The separator plate according to claim 5, wherein the distributing or collecting structure comprises at least one further line duct which adjoins the at least one cross duct such that at least some of the openings are fluidically connected to the line ducts by way of the at least one further line duct.

9. The separator plate according to claim 8, wherein the distributing or collecting structure comprises at least one further cross duct which adjoins the at least one further line duct such that at least some of the openings are fluidically connected to the line ducts by way of the at least one further cross duct and by way of the at least one further line duct.

10. A separator plate for an electrochemical system, comprising:
    at least one through opening for configuring a media duct for supplying media or for conducting media away;
    at least one bead assembly which is disposed about the at least one through opening to seal the through opening, wherein at least one flank of the bead assembly has passages for directing a medium through the at least one flank of the bead assembly; and
    a distributing or collecting structure for distributing media, or for collecting media, respectively, wherein the distributing or collecting structure has a multiplicity of line ducts and a multiplicity of openings;
    wherein the line ducts adjoin the passages in the at least one flank of the bead assembly on an external side of the bead assembly;
    wherein the openings are disposed on a side of the distributing or collecting structure that faces away from the bead assembly and the openings are fluidically connected to a bead interior, at least by way of the line ducts and the passages in the at least one flank of the bead assembly;
    wherein the distributing or collecting structure has a first fluid path which comprises a first line duct fluidically connected to a first opening, and has a second fluid path which comprises a second line duct fluidically connected to a second opening;
    wherein a minimum cross section of the first fluid path differs from a minimum cross section of the second fluid path;
    wherein the passages are disposed in a row, and the passages comprise:
        a first terminal passage that forms a first end of the row of passages, a second terminal passage that forms a second end of the row of passages, and further passages that are disposed between the first terminal passage and the second terminal passage;

wherein the further passages comprise a first further passage which is directly adjacent to the first terminal passage in the row of passages, and wherein the further passages comprise a second further passage which is directly adjacent to the second terminal passage in the row of passages; and wherein at least a portion of the distributing or collecting structure that extends transversely to the line ducts and/or along a direction of extent of the bead assembly from the first further passage up to the second further passage is aperiodically configured.

11. The separator plate according to claim 1, wherein the openings are provided by clearances in the separator plate, and/or wherein the separator plate is formed from metal.

12. The separator plate according to claim 1, wherein the separator plate has two interconnected individual plates, and wherein the bead assembly and the distributing or collecting assembly are configured in at least one of the individual plates.

13. The separator plate according to claim 12, wherein the individual plates are connected to one another by one of: a materially integral connection, a soldered connection, an adhesively bonded connection, a welded connection, or a laser-welded connection.

14. The separator plate according to claim 12, wherein the bead assembly and the distributing or collecting structure are configured so as to be integral to at least one of the individual plates.

15. A separator plate for an electrochemical system, comprising:

at least one through opening for configuring a media duct for supplying media or for conducting media away;

at least one bead assembly which is disposed about the at least one through opening to seal the through opening, wherein at least one flank of the bead assembly has passages for directing a medium through the bead flank; and a distributing or collecting structure for distributing media, or for collecting media, respectively, wherein the distributing or collecting structure has a multiplicity of line ducts and a multiplicity of openings;

wherein the line ducts adjoin the passages in the at least one flank of the bead assembly on an external side of the bead assembly;

wherein the openings are disposed on a side of the distributing or collecting structure that faces away from the bead assembly and the openings are fluidically connected to a bead interior, at least by way of the line ducts and the passages in the at least one flank of the bead assembly;

wherein the distributing or collecting structure has a first fluid path which comprises a first line duct fluidically connected to a first opening, and has a second fluid path which comprises a second line duct fluidically connected to a second opening, wherein a minimum cross section of the first fluid path differs from a minimum cross section of the second fluid path;

wherein an electrochemically active region is fluidically connected to the through opening by way of the distributing or collecting structure; and wherein a transition region is disposed between the distributing or collecting structure and the electrochemically active region, wherein the electrochemically active region is fluidically connected to the through opening by way of the transition region and by way of the distributing or collecting structure, and wherein the transition region has directing structures for directing media.

16. The separator plate according to claim 15, wherein the directing structures of the transition region are configured so as to be integral to the separator plate.

17. An electrochemical system for one of a fuel cell, electrochemical compressor, electrolyser, redox flow battery, or humidifier, comprising:

a plurality of separator plates according to claim 1, the separator plates stacked along a stacking direction; wherein the through openings of the separator plates are mutually aligned and form at least one media duct for supplying media or for conducting media away.

18. The electrochemical system according to claim 17, wherein a membrane is disposed between two adjacent separator plates of the stack.

19. The separator plate according to claim 10, wherein a cross section of the first opening differs from a cross section of the second opening.

20. The separator plate according to claim 10, wherein at least some of the openings transverse to the line ducts are aperiodically disposed.

21. The separator plate according to claim 10, wherein at least one of the openings is disposed so as to be offset from the line ducts, and or wherein the first opening and the second opening have different geometric shapes, and/or wherein the openings have one or a plurality of openings which are disposed at a first spacing from the bead assembly, and the openings have one or a plurality of openings which are disposed at a second spacing from the bead assembly, wherein the first spacing differs from the second spacing, and/or wherein a minimum cross section of the first line duct differs from a minimum cross section of the second line duct, and/or wherein the line ducts are aperiodically disposed, and/or wherein the first line duct and the second line duct have different geometries in cross section.

22. The separator plate according to claim 15, wherein a cross section of the first opening differs from a cross section of the second opening.

23. The separator plate according to claim 15, wherein at least some of the openings transverse to the line ducts are aperiodically disposed.

24. The separator plate according to claim 15, wherein at least one of the openings is disposed so as to be offset from the line ducts, and/or wherein the first opening and the second opening have different geometric shapes, and/or wherein the openings have one or a plurality of openings which are disposed at a first spacing from the bead assembly, and the openings have one or a plurality of openings which are disposed at a second spacing from the bead assembly, wherein the first spacing differs from the second spacing, and/or wherein a minimum cross section of the first line duct differs from a minimum cross section of the second line duct, and/or wherein the line ducts are aperiodically disposed, and/or wherein the first line duct and the second line duct have different geometries in cross section.

* * * * *